United States Patent
Lux et al.

(10) Patent No.: US 8,186,655 B2
(45) Date of Patent: May 29, 2012

(54) ADAPTERS AND METHODS FOR AERATION APPLICATIONS

(75) Inventors: Loras Raymond Lux, Port Washington, WI (US); Thomas M. Pokorsky, Port Washington, WI (US); Steven Wayne Miller, Port Washington, WI (US); Steven Allen Pagel, Lannon, WI (US)

(73) Assignee: Aquarius Technologies Inc., Port Washington, WI (US)

( * ) Notice: Subject to any disclaimer, the term of this patent is extended or adjusted under 35 U.S.C. 154(b) by 326 days.

(21) Appl. No.: 12/687,587

(22) Filed: Jan. 14, 2010

(65) Prior Publication Data

US 2011/0169176 A1 Jul. 14, 2011

(51) Int. Cl.
*B01F 3/04* (2006.01)

(52) U.S. Cl. ............ 261/122.1; 210/239; 29/401.1

(58) Field of Classification Search ........... 261/122.1, 261/122.2; 210/239, 758; 29/401.1
See application file for complete search history.

(56) References Cited

U.S. PATENT DOCUMENTS

| | | | | | |
|---|---|---|---|---|---|
| 4,889,620 | A | * | 12/1989 | Schmit et al. | 210/137 |
| 5,330,688 | A | * | 7/1994 | Downs | 261/122.2 |
| 5,705,063 | A | * | 1/1998 | Lee | 210/220 |
| 5,863,031 | A | * | 1/1999 | Veeder et al. | 261/122.1 |
| 6,145,817 | A | * | 11/2000 | Jager et al. | 261/122.2 |
| 6,811,148 | B2 | * | 11/2004 | Frankel et al. | 261/122.1 |
| 7,311,299 | B2 | * | 12/2007 | Sasajima | 261/122.1 |
| 2007/0001323 | A1 | * | 1/2007 | Kang | 261/122.1 |

* cited by examiner

*Primary Examiner* — Charles Bushey

(57) ABSTRACT

Adapters and methods related to aeration applications. An adapter for use in water treatment applications. The adapter includes a generally circular member for conversion of an aeration diffuser holder from a membrane diffuser element holder to a ceramic diffuser element holder. The generally circular member includes a top adapted to receive a retaining ring, a bottom adapted to receive an aeration diffuser holder, a diameter adapted to receive a ceramic diffuser element, and a height adapted to receive a ceramic diffuser element.

24 Claims, 4 Drawing Sheets

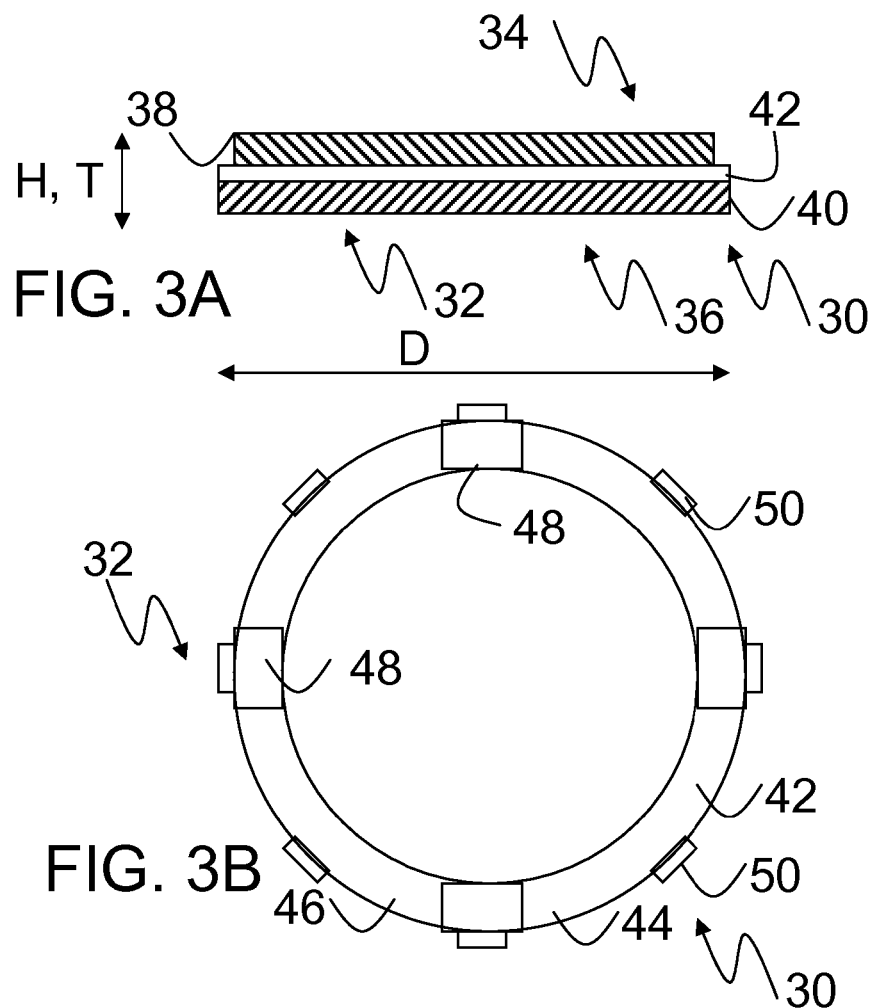
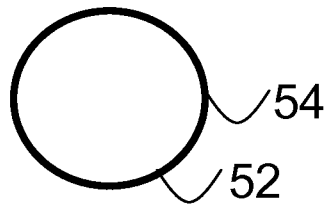
FIG. 4
Prior Art
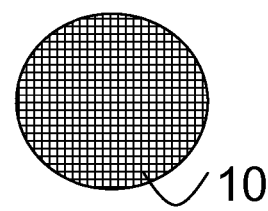
FIG. 5
Prior Art
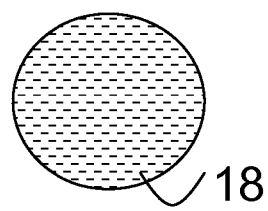
FIG. 6
Prior Art

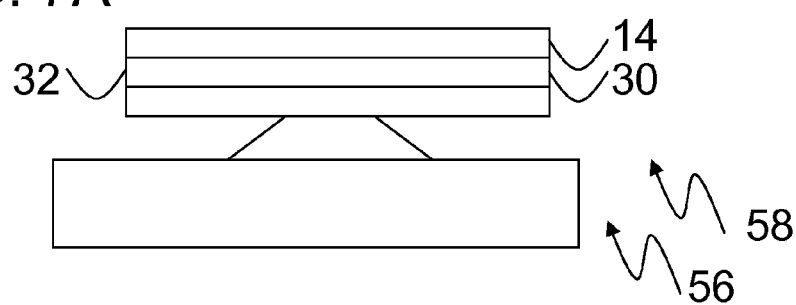
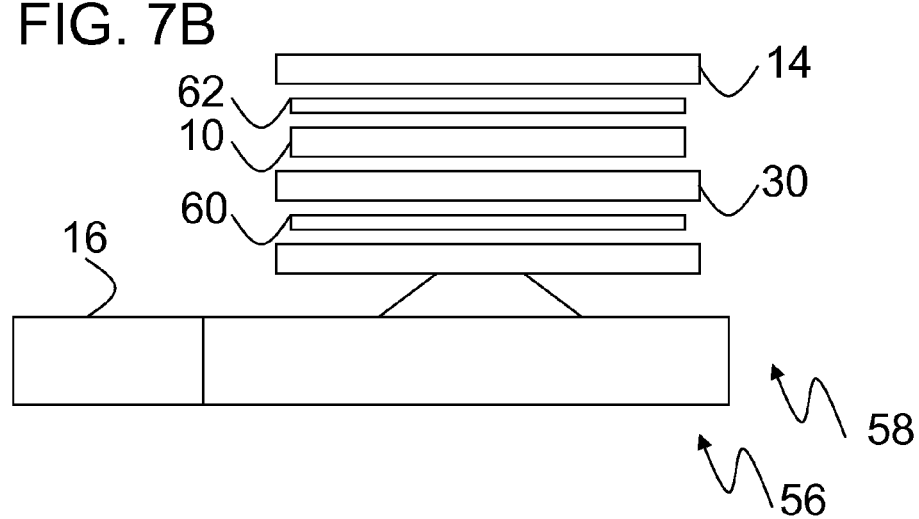

ADAPTERS AND METHODS FOR AERATION APPLICATIONS

BACKGROUND

1. Field of the Invention

This invention relates to adapters and methods for aeration applications.

2. Discussion of Related Art

Aeration provides oxygen for water treatment applications to assist biological processes in removal of contaminants. Aeration methods include entrainment and injection techniques. Aeration efficiency can be improved by increasing a contact surface area between air and water, such as by use of fine bubbles.

Typically, a supply of air flows into a diffuser element and forms the fine bubbles. A diffuser element holder contains the diffuser element and connects to the supply. The diffuser element typically can be formed of a porous ceramic material and more recently a rubber membrane material. Ceramic diffuser elements tend to be thicker than membrane diffuser elements. Diffuser elements are not readily interchangeable from membrane diffuser elements to ceramic diffuser elements due to limitations of the diffuser element holder.

Even with the above advances in aeration applications and water treatment technologies, there remains a need and a desire for additional adapters and methods, particularly to allow interchangeability between diffuser element types.

SUMMARY

This invention relates to adapters and methods for aeration applications. This invention provides interchangeability between diffuser element types, such as to allow a ceramic diffuser element to be used in a system previously equipped with and/or designed for membrane diffuser elements. The adapter provides a simple, low cost, and quick solution to address at least some of the limitations discussed above. The adapter also provides flexibility and/or optionality between diffuser element types for a water treatment operator.

According to a first embodiment, this invention includes an adapter for use in water treatment applications. The adapter includes a generally circular member for conversion of an aeration diffuser holder from a membrane diffuser element holder to a ceramic diffuser element holder. The generally circular member includes a top adapted to receive a retaining ring, a bottom adapted to receive an aeration diffuser holder, a diameter adapted to receive a ceramic diffuser element, and a height adapted to receive a ceramic diffuser element.

According to a second embodiment, this invention includes a fine bubble aeration assembly. The fine bubble aeration assembly includes a diffuser holder initially designed to contain a membrane diffuser element and for connection to a supply system. The fine bubble aeration assembly includes an adapter connected to the diffuser holder with a height adapted to receive a ceramic diffuser element. The fine bubble aeration assembly includes a ceramic diffuser element disposed within the adapter, and a retaining ring connected to the adapter.

According to a third embodiment, this invention includes a manifold with a plurality of the aeration assemblies disclosed within this specification.

According to a fourth embodiment, this invention includes an aeration basin with the aeration assemblies disclosed within this specification.

According to a fifth embodiment, this invention includes a method of converting an aeration diffuser holder from a membrane diffuser element holder to a ceramic diffuser element holder. The method includes the step of installing an adapter on a diffuser holder initially designed to contain a membrane diffuser element, and the step of placing a ceramic diffuser element within the adapter. The method includes the step of installing a retaining ring on the adapter.

According to a sixth embodiment, this invention includes a method of aerating a fluid. The method includes the step of at least partially submerging an aeration assembly in a fluid, wherein the aeration assembly includes a diffuser holder initially designed to contain a membrane diffuser element, an adapter connected to the diffuser holder, a ceramic diffuser element disposed within the adapter, and a retaining ring connected to adapter. The method includes the step of sparging air from the aeration assembly through at least a portion of the fluid.

BRIEF DESCRIPTION OF THE DRAWINGS

The above and other features and aspects of this invention are better understood from the following detailed description taken in view of the drawings wherein:

FIG. 3A a shows a partial side sectional view of an adapter, according to one embodiment;

FIG. 3B shows a top planar view of the adapter of FIG. 3A, according to one embodiment;

FIG. 4 shows a top planar view of a gasket material;

FIG. 5 shows a top planar view of a ceramic diffuser element;

FIG. 6 shows a top planar view of a membrane diffuser element;

FIG. 7A shows an assembled side view of an aeration assembly, according to one embodiment;

FIG. 7B shows an exploded side view of the aeration assembly of FIG. 7A, according to one embodiment;

DETAILED DESCRIPTION

This invention relates to adapters and methods for aeration applications.

Figure 1A:
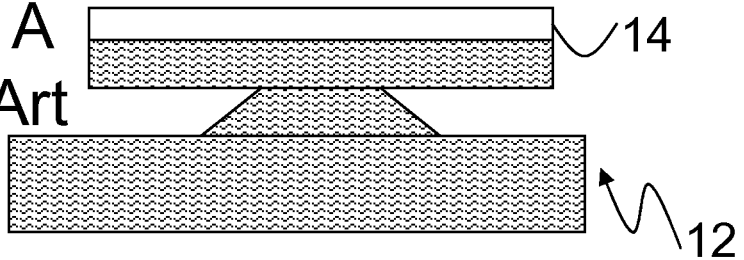
FIG. 1A shows an assembled side view of a ceramic diffuser element holder with a ceramic diffuser element.

FIG. 1A shows an assembled side view of a ceramic diffuser element holder 12 with a ceramic diffuser element 10, not shown. The ceramic diffuser element holder 12 has a portion adapted to connect to a supply pipe and a circular portion to receive a ceramic diffuser element 10, not shown. A retaining ring 14 holds the ceramic diffuser element 10, not shown, in the ceramic diffuser element holder 12.

Figure 1B:
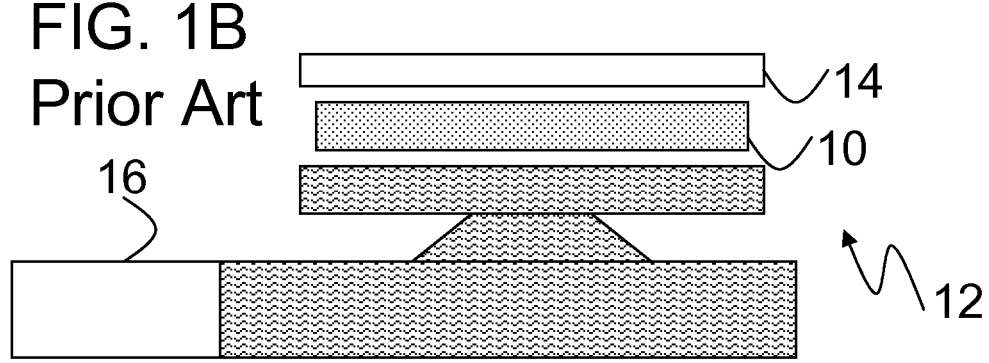
FIG. 1B shows an exploded side view of the ceramic diffuser element holder of FIG. 1A.

FIG. 1B shows an exploded side view of the ceramic diffuser element holder 12 of FIG. 1A and shows the ceramic diffuser element 10. A supply system 16 connects to the ceramic diffuser element holder 12.

Figure 2A:
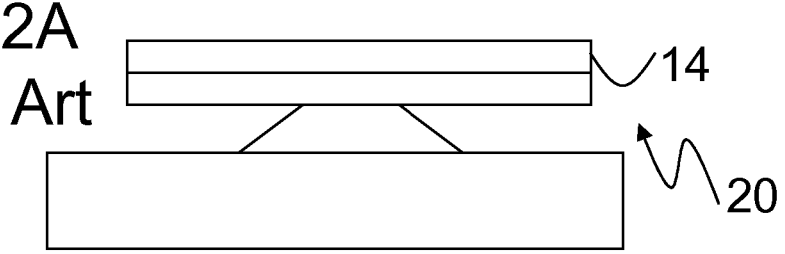
FIG. 2A shows an assembled side view of a membrane diffuser element holder with a membrane diffuser element.

FIG. 2A shows an assembled side view of a membrane diffuser element holder 20 with a membrane diffuser element 18, not shown. The membrane diffuser element holder 20 has a portion adapted to connect to a supply pipe and a circular portion to receive a membrane diffuser element 18, not shown. A retaining ring 14 holds the membrane diffuser element 18, not shown, in the membrane diffuser element holder 20.

Figure 2B:
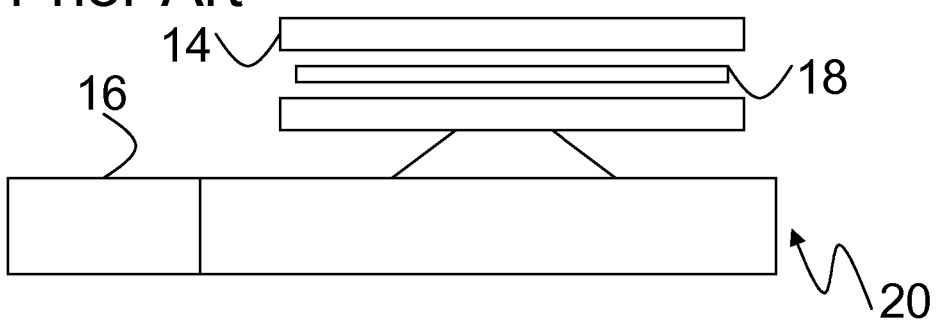
FIG. 2B shows an exploded side view of the membrane diffuser element holder of FIG. 2A.

FIG. 2B shows an exploded side view of the membrane diffuser element holder 20 of FIG. 2A and shows the membrane diffuser element 18. A supply system 16 connects to the membrane diffuser element holder 20.

FIG. 3A a shows a partial side sectional view of an adapter 30, according to one embodiment. The adapter 30 has a circular member 32. The adapter 30 has a top 34 opposite a bottom 36. The adapter 30 has a diameter D, a height H, and a cross sectional thickness T as shown by respective double headed arrows. The adapter 30 has a male threaded connection 38 (disposed at least generally externally) to connect to a retaining ring 14, not shown. The adapter 30 has a female threaded connection 40 (disposed at least generally internally) to connect to an aeration diffuser holder 56, not shown. The adapter 30 has a lip 42 located inside of the diameter D and located between at least a portion of the male threaded connection 38 and the female threaded connection 40.

FIG. 3B shows a top planar view of the adapter 30 of FIG. 3A, according to one embodiment. The adapter 30 has a circular member 32. The lip 42 can function as a support 44 for a ceramic diffuser element 10, not shown, and can function as a thread stop 46 for the female threaded connection 40, not shown. The lip 42 has one or more stand offs 48 or raised portions, such as for raising a location of the ceramic diffuser element 10, not shown, within the adapter 30. The adapter 30 includes one or more lugs 50 disposed outside the diameter D. While certain elements (stand offs 48, and lugs 50) of FIG. 3B have been shown as rectangular shapes for convenience, such elements may be readily curved and/or contoured to a profile of the circular member 32.

FIG. 4 shows a top planar view of a gasket material 52, such as an o-ring 54.

FIG. 5 shows a top planar view of a ceramic diffuser element 10 and FIG. 6 shows a top planar view of a membrane diffuser element 18.

FIG. 7A shows an assembled side view of an aeration assembly 58 with an aeration diffuser holder 56 with a ceramic diffuser element 10, not shown, according to one embodiment. The aeration assembly 58 has an adapter 30 with a circular member 32 connected to the aeration diffuser holder 56 (by the female threaded connection 40, not shown, of the adapter 30), a retaining ring 14 connected to the adapter 30 (by the male threaded connection 38, not shown, of the adapter 30), and a ceramic diffuser element 10, not shown, disposed within the adapter 30 when assembled (on the lip 42, not shown, and/or the stand offs 48, not shown).

FIG. 7B shows an exploded side view of the aeration assembly 58 of FIG. 7A with the ceramic diffuser element 10, according to one embodiment. The aeration assembly 58 includes a first gasket material 60 disposed between the aeration diffuser holder 56 and the adapter 30. The aeration assembly 58 includes a second gasket material 62 disposed between the ceramic diffuser element 10 and the retaining ring 14. A supply system 16 connects to the membrane diffuser element holder 20.

Figure 8:
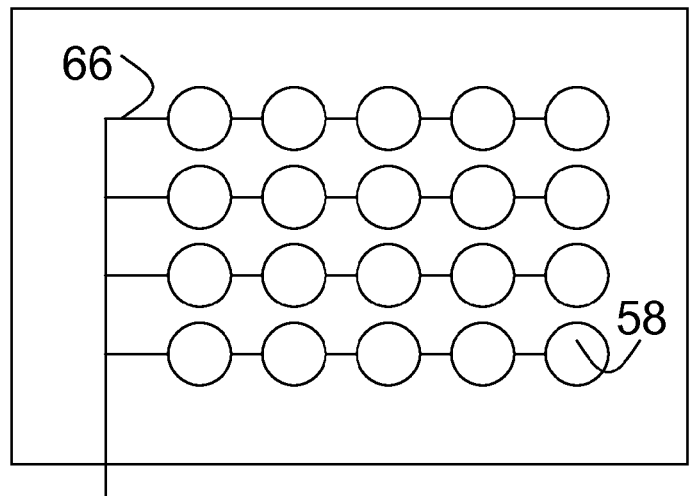
FIG. 8 shows a top planar view of an aeration basin, according to one embodiment.

FIG. 8 shows a top planar view of an aeration basin 64, according to one embodiment. The aeration basin 64 has a plurality of aeration assemblies 58 supplied by a manifold 66.

Figure 9:
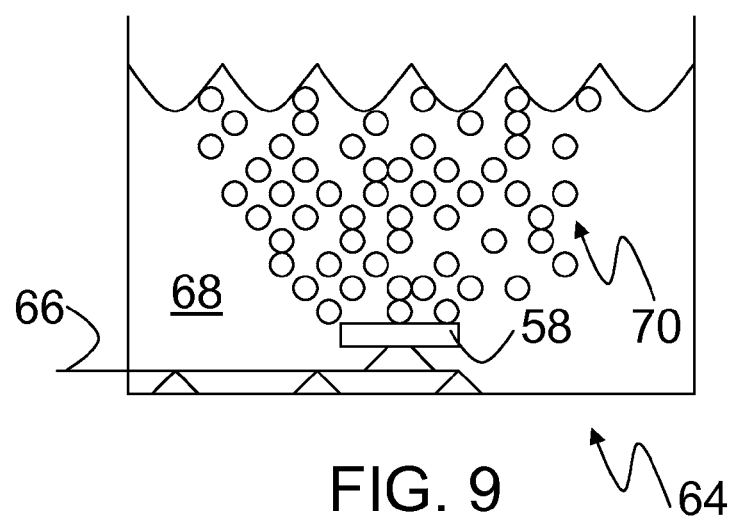
FIG. 9 shows a schematic view of a fluid being aerated, according to one embodiment.

FIG. 9 shows a schematic view of a fluid 68 being aerated by a multitude of bubbles 70, according to one embodiment. The aeration basin 64 includes an aeration assembly 58 supplied by a manifold 66 submerged within the fluid 68. The manifold 66 may include supports structures. The fluid 68 may be wastewater and the bubbles 70 may be air.

According to one embodiment, this invention may include an adapter for use in water treatment applications. The adapter may include a generally circular member for conversion of an aeration diffuser holder from a membrane diffuser element holder to a ceramic diffuser element holder. The generally circular member may include a top adapted to receive a retaining ring, a bottom adapted to receive an aeration diffuser holder, a diameter adapted to receive a ceramic diffuser element, and a height adapted to receive a ceramic diffuser element.

Adapter broadly refers to an attachment and/or a device for adapting and/or changing an apparatus and/or equipment to uses and/or configurations not originally intended, capable, and/or designed. Adapters may include a device for connecting two parts and/or portions of an apparatus and/or may include a device for providing additional capabilities and/or functionality to an apparatus, for example.

Spacer broadly refers to an attachment and/or device for making and/or enlarging a volume, an area, and/or the like. Spacers can provide additional room to accommodate other and/or different components and/or parts.

Water treatment broadly refers to processes and/or steps used to make water more acceptable for a desired use and/or application. Water treatment may include drinking water applications, industrial use applications, medial use applications, waste water applications, preparation for discharge to the environment, and/or the like. Water treatment may use any source of water, such as surface water, well water, fresh water, salt (brackish) water, industrial wastewater, municipal wastewater, storm water, and/or the like. Water treatment techniques may include chemical reactions, pH adjustment, biological reactions, separations, precipitations, demineralization, deionization, reverse osmosis, and/or the like. Water treatment may include steps to remove, reduce, and/or render safe one or more contaminants and/or pollutants.

Water broadly refers to substances primarily formed by $H_2O$. Water may be generally a liquid, such as taking on a shape of its container. Water may form solutions, emulsions, suspensions, and/or the like with other substances and/or materials. Water contaminants may include salts, organic compounds, suspended solids, dissolved gases, other materials, and/or the like.

Contaminants broadly refer to items and/or substances that make something impure, unfit, unclean, undesirable, corrupt, and/or the like. Contaminants may include regulated pollutants, such as those regulated by the U.S. Environmental Protection Agency (USEPA) and/or other appropriate agencies and/or authorities.

Treatment broadly refers to acting upon to improve and/or alter a substance and/or a material, such as to reduce contaminants, make pure, and/or the like.

Applications broadly refer to uses and/or practices of something, such as to advance and/or accomplish an outcome and/or a goal.

Generally broadly refers to being applicable to and/or a characteristic of a majority of individuals and/or items involved, such as typical, usually, and/or the like. According to one embodiment, generally includes being something and/or being at least somewhat like the something as well, such as being circular and/or at least somewhat circular, for example.

Circular broadly refers to having a shape and/or a form of a circle and/or being at least generally round.

Member broadly refers to a part, a portion, and/or a component, such as a part of a whole.

Conversion broadly refers to alter and/or change properties and/or characteristics.

Aeration broadly refers to supplying air, oxygen, other suitable gases, and/or the like to a solid and/or a liquid. Aeration may include diffusion of a gas into a liquid, such as air in to water. Without being bound by theory, diffusion rates and/or efficiencies can be increased by increasing a surface area between the gas and the liquid, such as by using smaller and/or finer bubbles.

Diffuser broadly refers to a device for distributing a substance in a plurality of directions, streams, jets, and/or the like.

Holder broadly refers to a device and/or a mechanism to hold, contain, mount, place, and/or the like an object and/or a thing.

Membrane broadly refers to a soft pliable sheet and/or material. Membranes may be permeable, such as with pores and/or openings to permit passage of a substance and/or material.

According to one embodiment, membrane diffuser elements may refer to a generally disk shaped thin rubber material with several slits and/or slots for passing air into a fluid while forming small and/or fine bubbles. The membrane diffuser element may include a gasket material integrally formed as a part and/or a portion of the membrane diffuser element. Desirably, the slits of the membrane diffuser elements may close when air does not flow. The closed slits can prevent flow of water back into the supply system.

Element broadly refers to a constituent part and/or a component, such as may form a part of a whole.

Ceramic broadly refers to a generally inorganic nonmetallic substance and/or material, such as a solid prepared by heat and subsequent cooling. Ceramic materials may include an amorphous structure, a crystalline structure, a partly crystalline structure, and/or the like.

Ceramic diffuser elements generally can be a generally porous material that causes formation of bubbles when gas passes into another liquid. The ceramic diffuser elements can be a monolithic design and/or a one piece structure.

Top broadly refers to a highest and/or uppermost region and/or part, such as an upper end, an edge, a surface, and/or the like. Desirably, the top includes a mechanism and/or an interface for connecting to at least a portion of a retaining ring, such a male threaded connection, a female threaded connection, a retaining clip, a snap fit, a hinge, a pin, a bolt, other faster systems, other mechanical combinations, and/or the like.

Adapted broadly refers to being made fit, such as for a specific use and/or situation.

Receive broadly refers to acting as a receptacle and/or a container, such as something and/or a part able to connect to and/or with another part and/or portion.

Retaining broadly refers a device and/or a structure to hold a device and/or an apparatus in place and/or a location with respect to one or more things.

Ring broadly refers to a circular band and/or structure for holding, connecting, hanging, pulling, packing, sealing, and/or the like.

The retaining ring may include any suitable size and/or shape, such as a generally circular shape with a diameter of between about between about 10 centimeters and about 30 centimeters. Desirably, the retaining ring includes a mechanism and/or an interface for connecting to at least a portion of an aeration assembly and/or an adapter, such as a male threaded connection, a female threaded connection, a retaining clip, a snap fit, a hinge, a pin, a bolt, other faster systems, other mechanical combinations, and/or the like.

Bottom broadly refers to a lowest and/or bottommost region and/or part, such as a lower end, an edge, a surface, and/or the like. Desirably, the bottom includes a mechanism and/or an interface for connecting to at least a portion of an aeration assembly, such a male threaded connection, a female threaded connection, a retaining clip, a snap fit, a hinge, a pin, a bolt, other faster systems, other mechanical combinations, and/or the like.

Diameter broadly refers to a distance and/or a dimension of an object and/or a body passing through a center and extending to a perimeter.

Length broadly refers to a longest and/or greatest distance and/or dimension of an object and/or a body.

Width broadly refers to a distance and/or a dimension across an object and/or a body, such as generally perpendicular to a length.

Height broadly refers to a distance and/or a dimension from a top to a bottom of an object and/or a body.

The adapter and/or the generally circular member may include any suitable size and/or shape. An effective diameter of the adapter and/or the generally circular member may include a distance of between about 5 centimeters and about 50 centimeters, between about 10 centimeters and about 30 centimeters, about 25 centimeters, and/or the like. The height of the adapter and/or the generally circular member may include a distance of between about 0.1 centimeters and about 20 centimeters, between about 1 centimeter and about 10 centimeters, about 4.5 centimeters, and/or the like. Desirably, the adapter may be sized to accommodate and/or fit into and/or with conventional aeration equipment.

The adapter and/or the generally circular member may be made and/or fabricated from any suitable material, such as polyvinyl chloride, chlorinated polyvinyl chloride, polypropylene, filled resins, other polymeric materials, other thermoplastic materials, metals, ceramics, and/or the like. Desirably, the adapter can be at least generally chemically inert with respect to the liquids and/or gases that it may be exposed to. According to one embodiment, the generally circular member may include primarily polyvinyl chloride, primarily chlorinated polyvinyl chloride, primarily polypropylene, and/or the like.

Primarily broadly refers to for the most part, such as at least about 51 percent, at least about 75 percent, at least about 90 percent, and/or at least about 95 percent, on a suitable basis. A suitable basis may include mass, volume, moles, and/or the like.

According to one embodiment, the adapter may include where the top has a male threaded connection, and the bottom has a female threaded connection. A combination of a male threaded connection and a female threaded connection can provide ready conversion of a membrane diffuser element holder and a retaining ring. The adapter can accept a ceramic diffuser element by providing additional depth for a ceramic diffuser element which can be thicker than an original membrane diffuser element. Other designs of the adapter and connecting structures are within the scope of this invention.

Threaded generally refers to a pitched and circular spiral arrangement and/or configuration, such as used on a screw and/or a bolt, for example. Threads can occur using either direction, such as right-handed threads and/or left-handed threads.

Connection broadly refers to a device and/or portion that links and/or connects one or more items and/or things together. Connections can be direct and/or indirect.

Male broadly refers to a projecting part and/or a portion for fitting into a corresponding female part and/or portion.

Female broadly refers to a hollow and/or groove part and/or a portion for receiving a corresponding male part and/or portion.

The threaded connection may include any suitable number of threads per distance and/or pitch, such as between about 0.1 threads per centimeter and about 5 threads per centimeter, between about 0.5 threads per centimeter and about 1.0 thread per centimeter, about 0.64 threads per centimeter, and/or the like.

Desirably, the height of the adapter and/or the generally circular member may include a dimension sufficient to at least accommodate the male threaded connection and the female threaded connection. The threaded connections may include any suitable number of revolutions of threads, such as at least about 0.5 threads, at least about 1.0 thread, at least about 2 threads, and/or the like.

According to one embodiment, the male threaded connection and the female threaded connection can each accommodate a gasket material.

Gasket broadly refers to a material and/or substance for sealing and/or making a joint fluid tight. The gasket material can be made from any suitable substance and/or material, such as rubber, synthetic rubber, fluoropolymer, elastomers, plastomers, and/or the like. The gasket material may include any suitable size and/or shape, such as a diameter corresponding to a diffuser element holder. The gasket material may form an o-ring, a donut, and/or the like. The gasket material may have any suitable cross sectional shape, such as generally round, generally rectangular, generally flat, and/or the like.

According to one embodiment, the adapter may include a lip within the diameter to form a thread stop for the female threaded connection and/or a support ring for the ceramic diffuser element. The thread stop can provide a limit to how far the adapter can be threaded onto a diffuser element holder.

According to a further embodiment, the support ring may include a plurality of stand offs and/or raised rings to raise a position of the ceramic diffuser element within the adapter. Stand offs broadly refer to something that raises and/or forms a distance. Stand offs and/or raised rings can provide a location and/or position of the ceramic diffuser element within an assembly, such as to support the ceramic diffuser element on and/or above a membrane support plate within the diffuser element holder. The stand offs and/or raised rings may have any suitable height, such as between about 1.0 millimeter and about 20 millimeters, between about 3 millimeters and about 10 millimeters, about 6.4 millimeters, and/or the like. Embodiments with thicker solid lips to raise the ceramic diffuser element instead of the stand offs and/or raised rings are within the scope of this invention.

The adapter may include any suitable shape and/or structure to assist and/or aid installation, operation, and/or the like. According to one embodiment, the adapter may include a plurality of lugs disposed on an exterior circumference of the generally circular member, such as to allow manual (hand and/or without tools) installation of the adapter. In the alternative, a tool may be used to install the adapter, such as a wrench, a pipe wrench, a strap wrench, and/or the like.

Lug broadly refers to something projecting upward and/or outward, such as to assist and/or aid in grip and/or handling. The lugs may have any suitable thickness, such as between about 1.0 millimeter and about 20 millimeters, between about 3 millimeters and about 10 millimeters, about 6.4 millimeters, and/or the like.

The adapter and/or the generally circular member may be made and/or fabricated by any suitable technique and/or manner, such as machining, milling, casting, molding, injection molding, and/or the like. According to one embodiment, the generally circular member may include a generally uniform cross sectional thickness. Without being bound by theory, a generally uniform cross sectional thickness can allow fabrication with even cooling and/or solidification, such as with reduced product dimpling and/or a faster cycle time. The generally uniform cross sectional thickness may include any suitable amount, such as between about 0.1 centimeters and about 10 centimeters, between about 0.2 centimeters and about 5 centimeters, about 0.5 centimeters, and/or the like.

Embodiments with a combined and/or integral adapter and retaining ring in a single element are within the scope of this invention.

According to one embodiment, the invention may include a fine bubble aeration assembly. The assembly may include a diffuser holder initially designed to contain a membrane diffuser element and for connection to a supply system. The assembly may include an adapter connected to the diffuser holder with a height adapted to receive a ceramic diffuser element. The assembly may include a ceramic diffuser element disposed within the adapter, and a retaining ring connected to the adapter. The elements and/or components of the assembly may include any and/or all features and/or characteristics discussed within this specification.

Fine bubble broadly refers to a use of many small bubbles to increase diffusion of a gas into a liquid. Fine bubbles can have any suitable size, such as a diameter of less than about 5 centimeters, less than about 1 centimeter, less than about 0.5 centimeters, 0.05 centimeters, 0.005 centimeters, and/or the like.

Assembly broadly refers to fitting together of manufactured parts into a complete machine, structure, unit and/or the like, such as a collection of parts.

Supply system may include a supply pipe, a manifold, a header, and/or the like. The supply system may include a motive force device, such as a fan, a blower, a rotary blower, a centrifugal blower, an axial blower, a compressor, and/or the like. The supply system can operate at any suitable pressure, such as between about 0.1 bars absolute and about 7 bars absolute, between about 0.2 bars absolute and about 2 bars absolute, about 0.3 bars absolute, and/or the like. The supply system may flow and/or supply any suitable material, such as air, compressed gas, oxygen, nitrogen, carbon dioxide, and/or the like. The air and/or gas can be at any suitable temperature, such as between about 0 degrees Celsius and about 100 degrees Celsius, above ambient conditions, about ambient conditions, and/or the like.

According to one embodiment, the assembly may include a first gasket material disposed between at least a portion of the diffuser holder and at least a portion of the adapter. The assembly may include a second gasket material disposed between at least a portion of the ceramic diffuser element and at least a portion of the retaining ring. The first gasket material and the second gasket material may have a same and/or different shape and/or material. Desirably, the first gasket material and the second gasket material can be interchangeable with each other. The first gasket material and the second gasket material may each may include an o-ring.

The adapter may include a generally circular member. The generally circular member may include a top with a male threaded connection adapted to receive the retaining ring, a bottom with a female threaded connection adapted to receive the aeration diffuser holder initially designed to contain a membrane diffuser element, a diameter adapted to receive the ceramic diffuser element, and a height adapted to receive the ceramic diffuser element and at least accommodate the male threaded connection and the female threaded connection. According to a further embodiment, the diameter may include between about 10 centimeters and about 30 centimeters, and the height may include between about 1 centimeter and about 10 centimeters.

The invention may include a manifold with a plurality of the aeration assemblies disclosed within this specification. Manifold broadly refers to something and/or a device that connects many and/or multiple units. Plurality broadly refers to more than one, such as at least about 2, at least about 10, at least about 25, and/or the like. The manifold may include sections of pipe, plastic pipe, conduit, ductwork, valves, fittings, and/or the like.

The manifold and the plurality of aeration assemblies can provide air to a larger volume of water than a single aeration assembly. The manifold may include any suitable combination of series and/or parallel connections. The manifold may include branches, laterals, segments, and/or the like. The manifold may include any suitable number of aeration assemblies, such as at least about 10, between about 50 and about 5,000, between about 100 and about 1,000, and/or the like.

The invention may include an aeration basin including the aeration assemblies disclosed within this specification. Basin broadly refers to a vessel for containing a liquid. The aeration basin may be an open cement walled volume with any suitable residence time for a fluid, such as at least about 1 hour, at least about 3 hours, at least about 12 hours, at least about 24 hours, at least about 48 hours, at least about 72 hours, and/or the like. The basin may include any suitable flow modifying devices and/or apparatuses, such as baffles, weirs, dams, and/or the like.

The aeration basin may include any suitable number of aeration assemblies and/or manifolds. The aeration basin may include any suitable volume, such as between about 1,000 liters and about 1,000,000,000 liters, between about 10,000 liters and about 1,000,000 liters, and/or the like. Desirably, the manifold and/or the aeration assemblies may mount to a bottom of the basin and/or tank.

According to one embodiment, the invention may include a method of converting an aeration diffuser holder from a membrane diffuser element holder to a ceramic diffuser element holder. The method may include the step of installing an adapter on a diffuser holder initially designed to contain a membrane diffuser element, and the step of placing a ceramic diffuser element within the adapter. The method may include the step of installing a retaining ring on the adapter.

Installing may broadly include establishing in a place, a condition a status, and/or the like. Installing may also include preparing and/or making ready for use. The step of installing the adapter and the retaining ring may include manually threading connections together without tools, such as by an installer, a technician, an operator, a maintenance person, a contractor, and/or the like. In the alternative, installing may include the use of one or more tools and/or machines. Installing may occur in any suitable location, such as in a factory, on location, in the field, and/or the like.

Placing broadly refers to putting in a particular place and/or location.

According to one embodiment, the method may include the step of sealing a connection between the diffuser holder and the adapter, and the step of sealing a connection between the adapter and the retaining ring. Sealing broadly refers to making liquid tight, such as with a gasket material.

The method may include the step of removing the retaining ring from the diffuser holder, and the step of removing a membrane diffuser element from the diffuser holder. Removing broadly refers to changing a location, taking away, and/or the like.

According to one embodiment, the invention may include a method of aerating a fluid. The method may include the step of at least partially submerging an aeration assembly in a fluid. The aeration assembly may include a diffuser holder initially designed to contain a membrane diffuser element, an adapter connected to the diffuser holder, a ceramic diffuser element disposed within the adapter, and a retaining ring connected to adapter. The method may include the step of sparging air from the aeration assembly through at least a portion of the fluid.

Submerging broadly refers to putting under and/or within a liquid and/or water.

Sparging broadly refers to agitating, dispersing, distributing, contacting, and/or mixing with a gas into a liquid.

While the invention has been described with respect to water aeration applications, those skilled in the art will readily appreciate and/or recognize application of the ideas and principles disclosed within this specification to other uses and/or applications. Other uses and/or applications may include mass transfer and/or mixing of other gases and/or liquids into other liquids, such as for food preparation, medical uses, industrial applications, and/or the like.

As used herein the terms "has", "having", "comprising" "with", "containing", and "including" are open and inclusive expressions. Alternately, the term "consisting" is a closed and exclusive expression. Should any ambiguity exist in construing any term in the claims or the specification, the intent of the drafter is toward open and inclusive expressions.

As used herein the term "and/or the like" provides support for any and all individual and combinations of items and/or members in a list, as well as support for equivalents of individual and combinations of items and/or members.

Regarding an order, number, sequence, and/or limit of repetition for steps in a method or process, the drafter intends no implied order, number, sequence and/or limit of repetition for the steps to the scope of the invention, unless explicitly provided.

Regarding ranges, ranges are to be construed as including all points between upper values and lower values, such as to provide support for all possible ranges contained between the upper values and the lower values including ranges with no upper bound and/or lower bound.

It will be apparent to those skilled in the art that various modifications and variations can be made in the disclosed structures and methods without departing from the scope or spirit of the invention. Particularly, descriptions of any one embodiment can be freely combined with descriptions of other embodiments to result in combinations and/or variations of two or more elements and/or limitations. Other embodiments of the invention will be apparent to those skilled in the art from consideration of the specification and practice of the invention disclosed herein. It is intended that the specification and examples be considered exemplary only, with a true scope and spirit of the invention being indicated by the following claims.

What is claimed is:

1. An adapter for use in water treatment applications, the adapter comprising a generally circular member for conversion of an aeration diffuser holder from a membrane diffuser element holder to a ceramic diffuser element holder, wherein the generally circular member comprises:
 a top adapted to receive a retaining ring;
 a bottom adapted to receive an aeration diffuser holder;
 a diameter adapted to receive a ceramic diffuser element; and
 a height adapted to receive a ceramic diffuser element.

2. The adapter of claim 1, wherein:
the top comprises a male threaded connection; and
the bottom comprises a female threaded connection.

3. The adapter of claim 2, wherein the height comprises a dimension sufficient to at least accommodate the male threaded connection and the female threaded connection.

4. The adapter of claim 2, wherein the male threaded connection and the female threaded connection each accommodate a gasket material.

5. The adapter of claim 2, further comprising a lip within the diameter to form a thread stop for the female threaded connection and a support ring for the ceramic diffuser element.

6. The adapter of claim 5, wherein the support ring further comprises a plurality of stand offs or raised rings to raise a position of the ceramic diffuser element within the adapter.

7. The adapter of claim 1, wherein the diameter comprises between about 10 centimeters and about 30 centimeters.

8. The adapter of claim 1, wherein the height comprises between about 1 centimeter and about 10 centimeters.

9. The adapter of claim 1, wherein the generally circular member comprises primarily polyvinyl chloride, primarily chlorinated polyvinyl chloride, primarily poly propylene, or combinations thereof.

10. The adapter of claim 1, further comprising a plurality of lugs disposed on an exterior circumference of the generally circular member.

11. The adapter of claim 1, wherein the generally circular member comprises a generally uniform cross sectional thickness.

12. The adapter of claim 11, wherein the generally uniform cross sectional thickness comprises between about 0.2 centimeters and about 5 centimeters.

13. A fine bubble aeration assembly comprising:
a diffuser holder initially designed to contain a membrane diffuser element and for connection to a supply system;
an adapter connected to the diffuser holder with a height adapted to receive a ceramic diffuser element;
a ceramic diffuser element disposed within the adapter; and
a retaining ring connected to the adapter.

14. The assembly of claim 13, further comprising:
a first gasket material disposed between at least a portion of the diffuser holder and at least a portion of the adapter; and
a second gasket material disposed between at least a portion of the ceramic diffuser element and at least a portion of the retaining ring.

15. The assembly of claim 14, wherein the first gasket material and the second gasket material each comprise an o-ring.

16. The assembly of claim 13, wherein the adapter comprises a generally circular member comprising:
a top with a male threaded connection adapted to receive the retaining ring;
a bottom with a female threaded connection adapted to receive the aeration diffuser holder initially designed to contain a membrane diffuser element;
a diameter adapted to receive the ceramic diffuser element; and
a height adapted to receive the ceramic diffuser element and at least accommodate the male threaded connection and the female threaded connection.

17. The assembly of claim 16, wherein:
the diameter comprises between about 10 centimeters and about 30 centimeters; and
the height comprises between about 1 centimeter and about 10 centimeters.

18. A manifold comprising a plurality of the aeration assemblies of claim 13.

19. An aeration basin comprising the aeration assemblies of claim 13.

20. A method of converting an aeration diffuser holder from a membrane diffuser element holder to a ceramic diffuser element holder, the method comprising:
installing an adapter on a diffuser holder initially designed to contain a membrane diffuser element;
placing a ceramic diffuser element within the adapter; and
installing a retaining ring on the adapter.

21. The method of claim 20, further comprising:
sealing a connection between the diffuser holder and the adapter; and
sealing a connection between the adapter and the retaining ring.

22. The method of claim 20, wherein both the installing steps comprise manually threading connections together without tools.

23. The method of claim 20, further comprising:
removing the retaining ring from the diffuser holder; and
removing a membrane diffuser element from the diffuser holder.

24. A method of aerating a fluid, the method comprising:
at least partially submerging an aeration assembly in a fluid, wherein the aeration assembly comprises a diffuser holder initially designed to contain a membrane diffuser element, an adapter connected to the diffuser holder, a ceramic diffuser element disposed within the adapter, and a retaining ring connected to adapter; and
sparging air from the aeration assembly through at least a portion of the fluid.

* * * * *